UNITED STATES PATENT OFFICE.

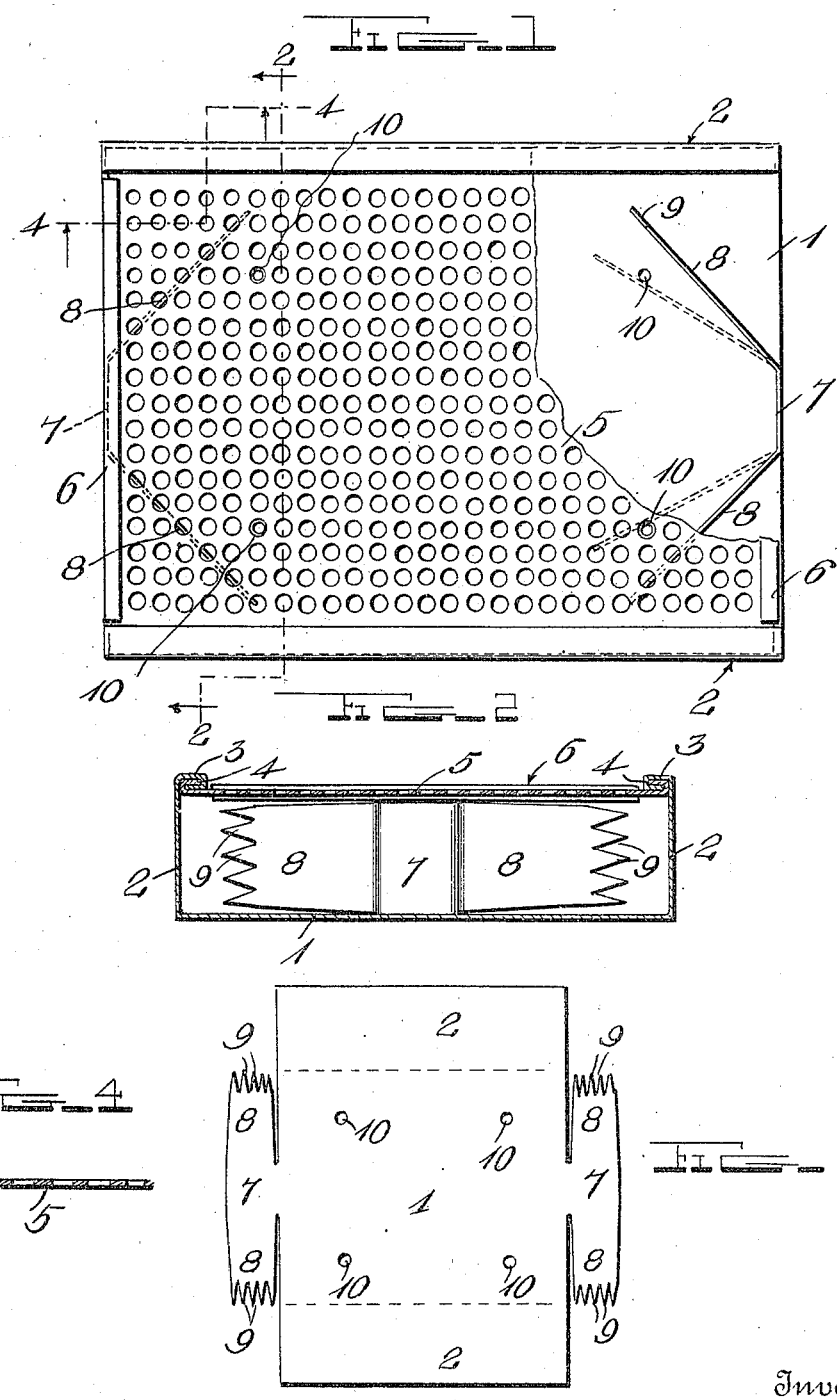

GEORGE O. TERRY, OF GOOD THUNDER, MINNESOTA.

MOUSE-TRAP.

948,908.  Specification of Letters Patent.  Patented Feb. 8, 1910.

Application filed December 7, 1908.  Serial No. 466,369.

*To all whom it may concern:*

Be it known that I, GEORGE O. TERRY, a citizen of the United States, residing at Good Thunder, in the county of Blue Earth and State of Minnesota, have invented certain new and useful Improvements in Mouse-Traps, and do declare the following to be a full, clear, and exact description of the invention, such as will enable others skilled in the art to which it appertains to make and use the same.

My invention relates to traps and particularly to mouse traps.

The object of the invention is to provide a simple and inexpensive device of this character which will have a deceptive appearance and which may be set in inoperative position for purposes of baiting the mice until they are sufficiently acquainted with the trap to have no fear of the same.

A further object of the invention is to provide a device of this character which may be constructed substantially of one sheet of material with the engaged prongs bent up from the blank and formed of such material that their inherent resiliency will be sufficient to normally maintain them in operative position.

With these and other objects in view, the invention consists of certain novel features of construction, combination and arrangement of parts, as will be more fully described and particularly pointed out in the appended claim.

In the drawings, Figure 1 is a top plan view with the cover partially removed and showing in dotted lines the baiting position of the spring doors; Fig. 2 is a transverse sectional view looking in the direction of the arrow; and Fig. 3 is a plan view of the blank. Fig. 4 is a detail section of one end of the top.

Referring more especially to the drawing, 1 represents the bottom of the trap and 2 the sides thereof. At the upper end of the sides the metal is bent over upon itself to form a channel 3 which receives the inwardly bent flanges 4 of the foraminous top 5, this locks the sides from any lateral movement and makes a rigid structure from end to end. The exposed ends of the top 5 are preferably covered with strips of metal 6, which prevents the roughened edges of the top from coming into engagement with the hands in opening and closing the trap.

At each end of the bottom I provide an extension 7 which is upwardly bent upon the end of the bottom, as shown in Fig. 1, then the member 7 is bent to form diagonally extending doors 8 which have formed at their ends the engaging prongs 9. The material of which these doors are made is preferably spring steel of light weight so as to have sufficient resiliency to normally maintain them in their diagonal position, and at the same time to give sufficiently to allow the body of the mouse to pass. The pronged ends of the doors in connection with the sides 2 of the body 1 constitute passages or openings which it will be seen give a free vista or sight from the trap, thus allaying the fears of the animals.

In the bottom of the trap I form four apertures 10, one adjacent each end of the spring doors 8 and adapted to receive a nail or other suitable device which may be placed in front of the doors, as shown in dotted lines in Fig. 1 and engaged with the apertures 10 and with one of the apertures in the foraminous top so as to hold the gate in unset position. In this condition the mice may travel in and out the trap freely to secure the bait which is usually placed upon the bottom in the center. The trap may be held in this condition for several nights and fresh bait put in each night. When the doors are released as shown in full lines in Fig. 1 the mice will have enough confidence to force their way past the spring doors, which requires little effort on their part. After the head of the animal is past the openings formed by the end of the spring doors and the said casing it is impossible for him to back out or to get out once he is in the trap. The harder the pressure against the spring door the greater it will penetrate into the body of the animal and resist the escape thereof.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described and ascertained the nature of my invention, what I claim as new and desire to secure by Letters-Patent, is:—

A two-piece trap comprising a sheet of material forming a bottom, sides and spring doors at each end of the bottom, the sides being bent up at right-angles to the bottom, inwardly extending locking flanges on the top of said sides, the doors being disconnected from the bottom except at its transverse center, said doors extending from the center toward the sides and adapted to spring inwardly, each individually, and a foraminous top connected to said locking flanges and adapted to prevent the sides from spreading, said top and bottom having apertures to receive door retaining members.

In testimony whereof I have hereunto set my hand in presence of two subscribing witnesses.

GEORGE O. TERRY.

Witnesses:
F. H. MORLOCK,
H. C. MIELKE.